(12) United States Patent
Bilgin et al.

(10) Patent No.: US 8,582,907 B2
(45) Date of Patent: Nov. 12, 2013

(54) METHOD FOR RECONSTRUCTION OF MAGNETIC RESONANCE IMAGES

(75) Inventors: Ali Bilgin, Tucson, AZ (US); Yookyung Kim, Tucson, AZ (US); Mariappan S. Nadar, Plainsboro, NJ (US)

(73) Assignees: Siemens Aktiengesellschaft, Munich (DE); Arizona Board of Regents on Behalf of University of Arizona, Tuscon, AZ (US)

( * ) Notice: Subject to any disclaimer, the term of this patent is extended or adjusted under 35 U.S.C. 154(b) by 0 days.

(21) Appl. No.: 12/938,572

(22) Filed: Nov. 3, 2010

(65) Prior Publication Data

US 2012/0008843 A1    Jan. 12, 2012

Related U.S. Application Data

(60) Provisional application No. 61/280,816, filed on Nov. 9, 2009.

(51) Int. Cl.
*G06K 9/46* (2006.01)
*H04N 7/12* (2006.01)

(52) U.S. Cl.
USPC ..................... 382/240; 375/240.19

(58) Field of Classification Search
USPC ......... 382/131, 240, 248, 276, 305, 312, 232; 348/424.1; 375/240.18, 240.19
See application file for complete search history.

(56) References Cited

U.S. PATENT DOCUMENTS

| | | | | |
|---|---|---|---|---|
| 5,119,816 A | * | 6/1992 | Gevins | 600/383 |
| 7,139,754 B2 | * | 11/2006 | Goutte et al. | 707/740 |
| 7,602,183 B2 | * | 10/2009 | Lustig et al. | 324/309 |
| 7,843,456 B2 | * | 11/2010 | Xu et al. | 345/473 |
| 2011/0090394 A1 | * | 4/2011 | Tian et al. | 348/424.1 |

OTHER PUBLICATIONS

David L. Donoho, "Compressed Sensing", IEEE Transactions on Information Theory, vol. 52, No. 4, Apr. 2006, pp. 1289-1306.
Emmanuel J. Candes, et al., "Enhancing Sparsity by Reweighted L1 Minimization", J. Fourier Anal Appl (2008) 14: 877-905.
Lihan He, et al., "Exploiting Structure in Wavelet-Based Bayesian Compressive Setting", IEEE Transactions on Signal Processing, vol. 57, No. 9, Sep. 2009, pp. 3488-3497.
Yingson Zhang, et al., "Image Deconvolution Using a Gaussian Scale Mixtures Model to Approximate the Wavelet Sparseness Constraint", IEEE International Conference on Acoustics, Speech and Signal Processing, 2009, pp. 681-684.
Javier Portilla, et al., "Image Denoising Using Scale Mixtures of Gaussians in the Wavelet Domain", IEEE Transactions on Image Processing, vol. 12, No. 11, Nov. 2003, pp. 1338-1351.
Thomas Blumensath, et al., "Iterative Thresholding for Sparse Approximations", J. Fourier Anal Appl (2008) 4: 629-654.

(Continued)

*Primary Examiner* — Kanjibhai Patel
(74) *Attorney, Agent, or Firm* — Donald B. Paschburg; F. Chau & Associates, LLC

(57) ABSTRACT

A method for constructing an image includes acquiring image data in a sensing domain, transforming the acquired image data into a sparse domain, approximating sparse coefficients based on the transformed acquired image data, performing a Bayes Least Squares estimation on the sparse coefficients based on Gaussian Scale Mixtures Model to generate weights, approximating updated sparse coefficients by using the weights and acquired image, constructing an image based on the updated sparse coefficients, and displaying the constructed image.

20 Claims, 6 Drawing Sheets

(56) References Cited

OTHER PUBLICATIONS

Ingrid Daubechies, et al., "Iteratively Re-Weighted Lease Squares Minimization for Sparse Recovery", Communications on Pure and Applied Math, vol. 63, Issue 1, pp. 1-38, Jan. 2010.

Richard G. Baraniuk, et al., "Model-Based Compressive Sensing", IEEE Transactions on Information Theory, vol. 56, Issue 4, pp. 1982-2001, Apr. 2010.

Eero P. Simoncelli, "Modeling the Joint Statistics of Images in the Wavelet Domain", Proc. SPIE 44th Annual Meeting, vol. 3813, pp. 188-195, Denver, Colorado (Jul. 1999).

Emmanuel Candes, et al., "Robust Uncertainty Principles: Exact Signal Reconstruction from Highly Incomplete Frequency Information", IEEE Transaction Information Theory, vol. 52, Issue 2, pp. 489-509, (Feb. 2006).

Wainwright, Martin J., et al., "Scale Mixtures of Gaussians and the Statistics of Natural Images", Advances in Neural Information Processing Systems 12 S.A. Solla, T.K. Leen and K.-R. Muller (eds.), pp. 855-861, MIT Press (2000).

Pierre Jerome Garrigues, "Sparse Coding Models of Natural Images: Algorithms for Efficient Inference and Learning of Higher-Order Structure", Technical Report No. UCB/EECS-2009-71, http.//www.eecs.berkeley.edu/Pubs/TechRpts/2009/EECS-2009-71.html, May 20, 2009.

Siwei Lyu, et al., "Statistical Modeling of Images with Fields of Gaussian Scale Mixtures", Advances in Neural Information Processing Systems, eds B. Scholkopf, J. Platt and T. Hofmann, vol. 19, May 2007, MIT Press, Cambridge, MA.

\* cited by examiner

FIG. 3

Input: Projection matrix A, measurements b, constant $r(r<1)$, CS problem $CS$, Eq. for weights $WT$, BLS-GSM model $M_{BLS-GSM}$ Output: Estimate of sparse coeffs. $\hat{x}$ 0. $k=0, x^0=0, W^0=I$     initialize
1. $\sigma = STD(HHl)$     calculate $\sigma$
2. do
3.    $k \leftarrow k+1$     increment iteration index
4.    $x^k \leftarrow CS(A, b, x^{k-1}, W^{k-1})$     estimate sparse coeffs.
5.    $\tilde{x} \leftarrow M_{BLS-GSM}(x^k, \sigma)$     impose BLS-GSM model
6.    $W^{k+1} \leftarrow WT(\tilde{x})$     update weights
7.    $\sigma \leftarrow r\sigma$     decrease $\sigma$
8. while (halting criterion false)
9. return $\hat{x} \leftarrow x^k$

METHOD FOR RECONSTRUCTION OF MAGNETIC RESONANCE IMAGES

CROSS-REFERENCE TO RELATED APPLICATIONS

This application claims priority to U.S. Provisional Application No. 61/280,816, filed on Nov. 9, 2009, the disclosure of which is incorporated by reference herein.

BACKGROUND OF THE INVENTION

1. Technical Field

The present disclosure relates generally to the field of imaging, and more particularly to reconstruction of medical images using prior knowledge associated with transform domain coefficients.

2. Discussion of Related Art

Compressed Sensing (CS) theory provides an attractive alternative to conventional Nyquist sampling. CS theory demonstrated that, under certain conditions, signals with sparse representations can be reconstructed from much fewer measurements than suggested by the Nyquist theory. Such reconstruction can be quite useful in applications where acquiring data at the desired Nyquist rate is either expensive or impossible due to physical/hardware constraints.

Signals of practical interest have sparse representations using a transform domain. Sparsity refers the number of nonzero components when most transform coefficients except a few large coefficients are approximated to zero. Based on a sparseness assumption, CS theory states that a signal can be reconstructed by finding the sparsest solution among infinitely many candidates satisfying the measurements. Existing CS reconstruction techniques include reweighted $L_1$ minimization (RL1), Iteratively Reweighted Least Squares (IRLS), and Iterative Hard Thresholding (IHT). However, these techniques do not exploit prior knowledge about the statistical dependencies between transform domain coefficients beyond sparsity.

SUMMARY OF THE INVENTION

According to an exemplary embodiment of the present invention, a method for constructing an image includes acquiring image data in a sensing domain, transforming the acquired image data into a sparse domain, approximating sparse coefficients based on the transformed acquired image data, performing a Bayes Least Squares estimation on the sparse coefficients based on a Gaussian Mixtures Model to generate weights, approximating updated sparse coefficients using the weights and acquired image data, constructing an image based on the updated sparse coefficients, and displaying the constructed image.

According to another exemplary embodiment of the present invention, a method for constructing an image includes acquiring image data in a sensing domain, transforming the acquired image data into a sparse domain, setting a variance based on a standard deviation of wavelet coefficients of a sub-band of the transformed acquired image data having a diagonal orientation and the highest frequency, performing a Bayes Least Squares estimation on sparse coefficients of the wavelet coefficients based on a Gaussian Mixtures Model with the variance to generate weights, approximating updated sparse coefficients by using the weights and acquired image data, constructing an image based on the updated sparse coefficients, and displaying the constructed image.

The image data acquired by the above methods may be performed using various techniques such as magnetic resonance imaging (MRI), computed tomography (CT), computed axial tomography (CAT), positron emission tomography (PET), etc.

BRIEF DESCRIPTION OF THE DRAWINGS

Exemplary embodiments of the invention can be understood in more detail from the following descriptions taken in conjunction with the accompanying drawings in which:

FIG. 3 illustrates exemplary pseudo-code for generating an estimate of sparse coefficients according to an exemplary embodiment of the present invention;

DETAILED DESCRIPTION OF EXEMPLARY EMBODIMENTS

In general, embodiments of the present invention relate to improving various wavelet-based Compressed Sensing (CS) image reconstruction techniques by incorporating a Gaussian Scale Mixtures (GSM) model.

Figure 1:
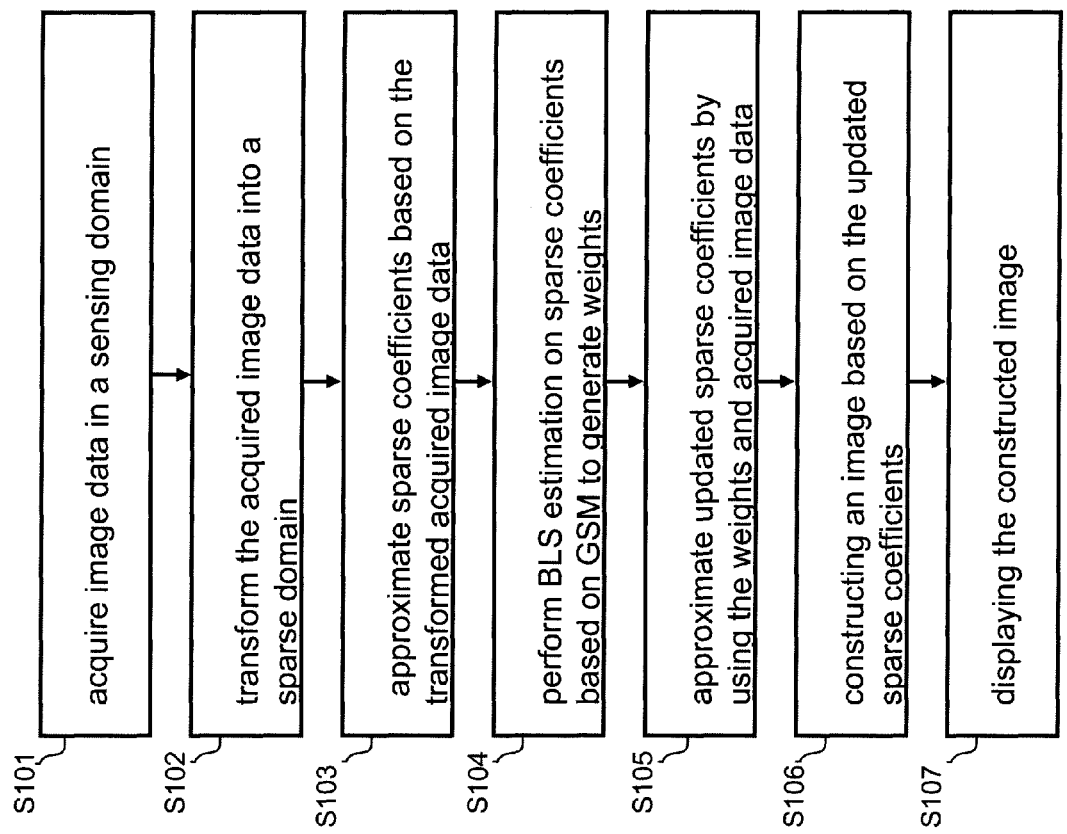
FIG. 1 illustrates a method of constructing an image according to an exemplary embodiment of the present invention.

For example, FIG. 1 illustrates a method for constructing an image according to an exemplary embodiment of the invention. Referring to FIG. 1, the method includes acquiring image data in a sensing domain (S101), transforming the acquired image data into a sparse domain (S102), approximating sparse coefficients based on the transformed acquired image data (S103), performing a Bayes Least Squares (BLS) estimation on the sparse coefficients based on a Gaussian Scale Mixtures (GSM) model to generate weights (S104), approximating updated sparse coefficients by using the weights and acquired image data (S105), constructing an image based on the updated sparse coefficients (S106), and displaying the constructed image (S107).

The image data may be acquired by performing one of various medical imaging scans (e.g., MRI, CT, CAT, PET, etc.) over an area of the body. The acquired image data may be transformed into the sparse domain by performing a wavelet transform.

A wavelet transform produces efficient representations of natural images by decomposing them into multi-scale sub-bands having different frequencies and orientations. The wavelet transform may be performed by applying a series of a low-pass filter (LPF) and a high-pass filter (HPF) to a 2D image followed by sub-sampling. The nature of the 2D image and the consecutive decompositions generates four directionally oriented sub-bands (LL, LH, HL, and HH) and a hierarchical quadtree structure of wavelet coefficients.

Figure 2:
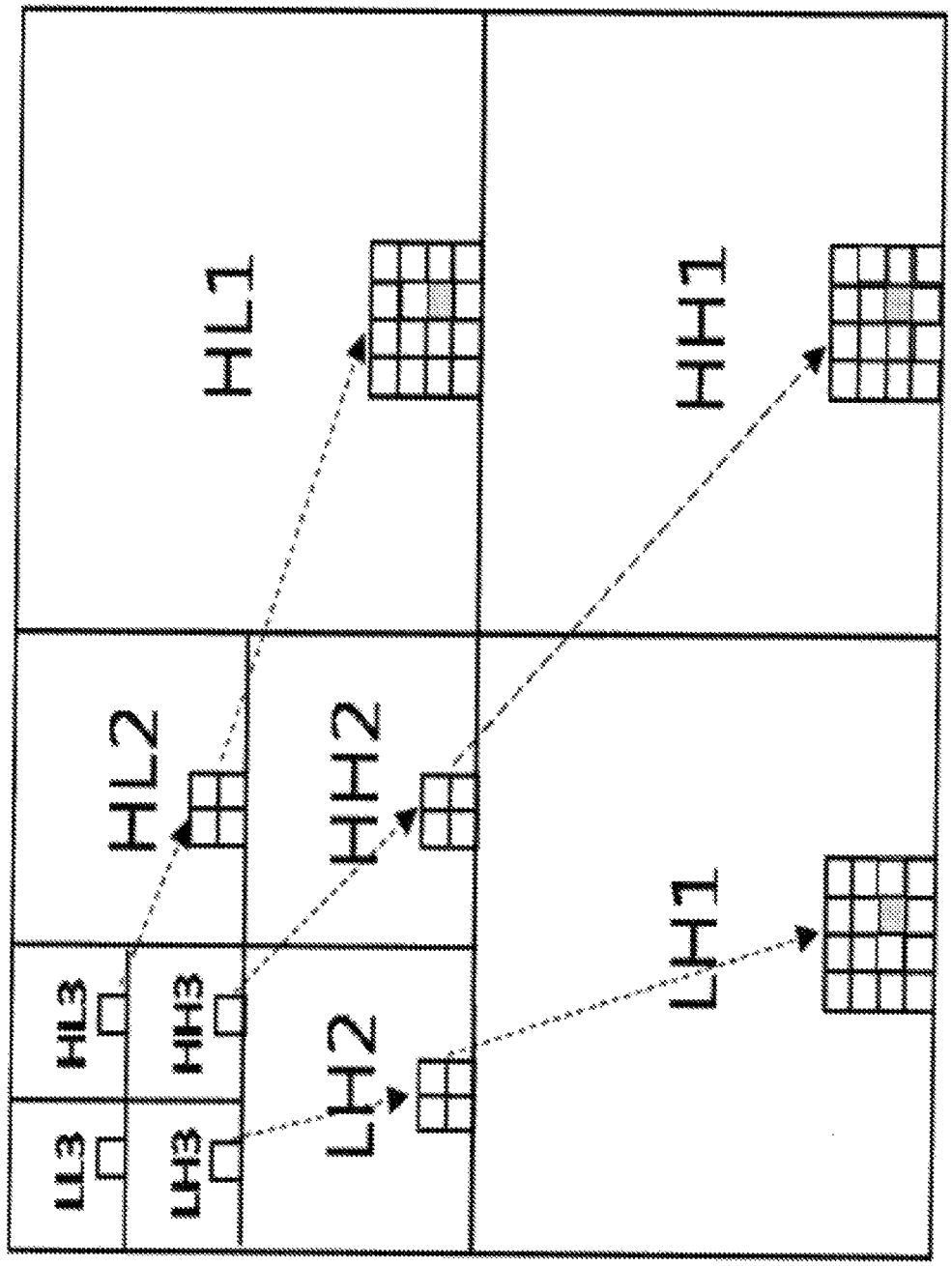
FIG. 2 illustrates exemplary hierarchical relationships between sub-bands generated by a wavelet transform.

A quadtree structure is tree data in which each internal node has exactly four children. In this hierarchical structure, a coefficient at the coarser scale (e.g., referred to as the parent)

is correlated with the spatially co-located coefficients at the finer scale (e.g., referred to as the children). The coefficients in each sub-band have four children coefficients in the sub-band at a finer scale and a same orientation. This hierarchical relation is called a parent/child relation, which is illustrated as the arrows in FIG. 2. The concepts of descendants and ancestors can be defined in a similar manner. In addition, wavelet coefficients are statistically dependent on their spatially adjacent neighbors.

The approximating of the sparse coefficients may be performed using a compressed sensing (CS) method, such as Reweighted $L_1$ minimization (RL1), Iteratively Reweighted Least Squares (IRLS), or Iterative Hard Thresholding (IHT). An inverse wavelet transform could be applied to the approximated sparse coefficients to construct an image for display. However, the resulting image may have artifacts due to noise.

It has been observed empirically that the densities of wavelet coefficients of natural images are non-Gaussian with a sharper peak and heavier tails and large magnitude coefficients are sparsely distributed within each wavelet sub-band and occur in clusters. A GSM model may account for the shape of the wavelet coefficient marginals as well as the correlation between magnitudes of neighboring coefficients.

Thus, the quality of the image to be constructed, may be improved, if before the inverse wavelet transform is performed, the sparse coefficients are optimized using a GSM model.

Consider a neighborhood of wavelet coefficients v. When the neighborhood is corrupted by noise (e.g., Gaussian noise), it may be represented by equation 1 as follows:

$$y=v+w \quad (1),$$

where v is the neighborhood of wavelet coefficients, and w is Gaussian noise (e.g., additive white noise). The neighborhood of wavelet coefficients v can be modeled as a product by equation 2 as follows:

$$v=\sqrt{z}u \quad (2),$$

where variable u is a Gaussian vector and variable z is a scalar variable (e.g., a positive hidden multiplier). If noise w is independent additive white noise, then the random variables z, u, and w are independent from one another.

This GSM structure of the neighborhood of wavelet coefficients v may enable a more accurate reproduction of the high kurtosis nature of their distribution. In probability theory and statistics, kurtosis is a measure of the "peakedness" of a probability distribution of a real-valued random variable.

Let $v_c$ denote a wavelet coefficient and v its neighborhood. An estimate of the wavelet coefficient (denoted by $\hat{v}_c$ may be obtained by using Bayes least squares (BLS) estimation according to equation 4 as follows:

$$\hat{v}_c=E\{v_c|y\}=\int_0^\infty E\{v_c|y,z\}p(z|y)dz \quad (3).$$

where a maximum likelihood solution is obtained and posterior probability p(z|y) is defined by equation 4 as follows:

$$p(z|y) = \frac{p(y|z)p(z)}{\int_0^\infty p(y|z)p(z)dz}. \quad (4)$$

The estimate of equation 3 (e.g., referred to as BLS-GSM) may be employed in wavelet-based image de-noising. For example, BLS-GSM may be applied to CS techniques such as RL1, IRLS, and IHT, which utilize the magnitudes of the sparse domain coefficients in an independent manner while determining the weights to be used in a next iteration.

A neighborhood of reconstructed wavelet coefficients y may be modeled as the sum of the true neighborhood of wavelet coefficients and a random variable w accounting for any remaining artifacts (e.g., measurement noise and under-sampling artifacts): y=v+w. Under the assumption that w is a zero-mean Gaussian vector with a variance (e.g., $\sigma^2$), and estimate of the wavelet coefficient $\hat{v}_c$ surrounded by the given neighborhood v may be obtained using equation 3 above. The variance parameter $\sigma$ may then be initialized using the standard deviation of the wavelet coefficients in the highest frequency diagonal sub-band (e.g., HH1) prior to the start of CS recovery. Once estimates of the wavelet coefficient $\hat{v}_c$ are determined, these estimates are used to determine the weights for the CS techniques of RL1, IRLS, and IHT, respectively, so that the statistical dependencies between sparse domain coefficients can be exploited. Thus, instead of directly using the magnitudes of the wavelet coefficients obtained in the previous iteration, the estimates of the wavelet coefficients from BLS-GSM model are used to determine the weights for the next iteration.

FIG. 3 illustrates exemplary pseudo-code for generating an estimate of sparse coefficients according to an exemplary embodiment of the present invention. Referring to FIG. 3, lines 0-1 initialize parameters (e.g., the iteration index k is initialized to zero and the variance $\sigma$ is initialized to the standard deviation of the HH1 sub-band), line 2 is the start of the iteration loop, line 3 performs an increment of the iteration index k, line 4 estimates the sparse coefficients $x^k$ by performing a CS technique on a Projection Matrix A, measurements b, an estimate of the sparse coefficients (e.g., $x^{k-1}$), and a diagonal weight matrix ($W^{k-1}$), line 5 uses BLS-GSM (e.g., see equation 3 above) on the estimate of the sparse coefficients $x^k$ and the variance a to generate a modified estimate of the sparse coefficients $\tilde{x}$, line 6 generates a diagonal weight matrix $W^{k+1}$ based on the modified sparse coefficients $\tilde{x}$, line 7 reduces the variance a (e.g., by multiplying the variance by a fraction r), line 8 checks to determine whether the looping should continue, and line 9 returns the last estimate of the sparse coefficients as the current estimate of the sparse parameters $\tilde{x}$. Assuming that the checking of line 8 has determined that the looping should continue, the pseudo-code restarts at line 3 and continues to line 4 to pass the weight $W^{k+1}$ to the CS technique to generate a new estimate of the sparse coefficients $x^k$, which may be output as the estimate $\hat{x}$ if line 8 deems that the looping should end.

As discussed above, the CS technique may be RL1, IRLS, or IHT. In RL1, a minimization problem may be defined by equation 5 as follows:

$$x^k = \underset{x}{\operatorname{argmin}}\|W^k x\|_1 \text{ such that } \|b - Ax\|_2 \le \varepsilon, \quad (5)$$

where x denotes the sparse coefficient vector, b denotes the measurement vector, A is the matrix that projects the sparse coefficients x into the measurement space, $x^k$ is the estimate of the sparse coefficients at iteration k, and $\varepsilon$ is used to account for noise in the measurements. The weight $W^k$ is a diagonal weight matrix whose diagonal entries at iteration k are defined by equation 6 as follows:

$$w^k(i)=1/|x^{k-1}(i)+\delta| \quad (6),$$

where $\delta$ is a small value to avoid division by zero. According to equation 6 above, the weights may be initialized to ones and refined at each iteration as the inverse of the solutions obtained at the previous iteration. As discussed above, BLS-GSM generates $x^{k-1}$, and thus the weight $W^k$ used by RL1

(e.g., on a second iteration) is calculated based on the output of the BLS-GSM. When RL1 uses the weight generated by BLS-GSM, the resulting method can be referred to as BLS-GSM RL1.

IRLS alternates between estimating the sparse vector x and redefining the weights. According to IRLS, estimation of the sparse vector at iteration k may be performed using equation 7 as follows:

$$x^k = \operatorname*{argmin}_x W^k \|b - Ax\|_2^2, \quad (7)$$

where weight $W^k$ is a diagonal weight matrix whose diagonal entries at iteration k may be defined using equation 8 as follows:

$$w^k(i) = 1/\sqrt{|x^{k-1}(i)|^2 + \delta^2} \quad (8).$$

As discussed above, BLS-GSM generates $X^{K-1}$, and thus the weight $w^k$ used by IRLS (e.g., on a second iteration) is calculated based on the output of the BLS-GSM. When IRLS uses the weight generated by BLS-GSM, the resulting method can be referred to as BLS-GSM IRLS.

Iterative Hard Thresholding (IHT) aims to solve the sparsity problem (S-sparse problem) represented by equation 9 as follows:

$$\operatorname*{argmin}_x \|b - Ax\|_2 \text{ such that } \|x\|_0 \leq S. \quad (9)$$

using an iterative method defined by equation 10 as follows:

$$x^{k+1} = H_S(x^S + \mu A^H(b - Ax^k)) \quad (10)$$

where $H_S$ is an operator retaining the S largest elements and setting the remainder to zero and μ denotes a step size to minimize errors in each iteration. The vector b may represent the undersampled k-space measurements, and the A maybe a matrix representing the sequential application of the inverse wavelet transform and an undersampled Fourier transform. From equation 10, it appears that IHT does not explicitly use weights, which can be generated by BLS-GSM. However, equation 10 can be re-written as equation 11 as follows:

$$x^{k+1} = W^k(x^k + \mu A^H(b - Ax^k)) \quad (11)$$

where the entries of the diagonal weight matrix $W^k$ may be determined according to equation 12 as follows:

$$W^k(i) = \begin{cases} 1 & H_s(x^{k-1}(i)) | > 0 \\ 0 & \text{otherwise.} \end{cases} \quad (12)$$

The entries of the weight matrix $W^k$ corresponding to the S largest elements are set to one and all other entries are set to 0. Thus, IHT can use the weight generated by BLS-GSM when equations 11 and 12 are used. When IHT uses the weight generated by BLS-GSM, the resulting method can be referred to as BLS-GSM IHT.

Figure 4:
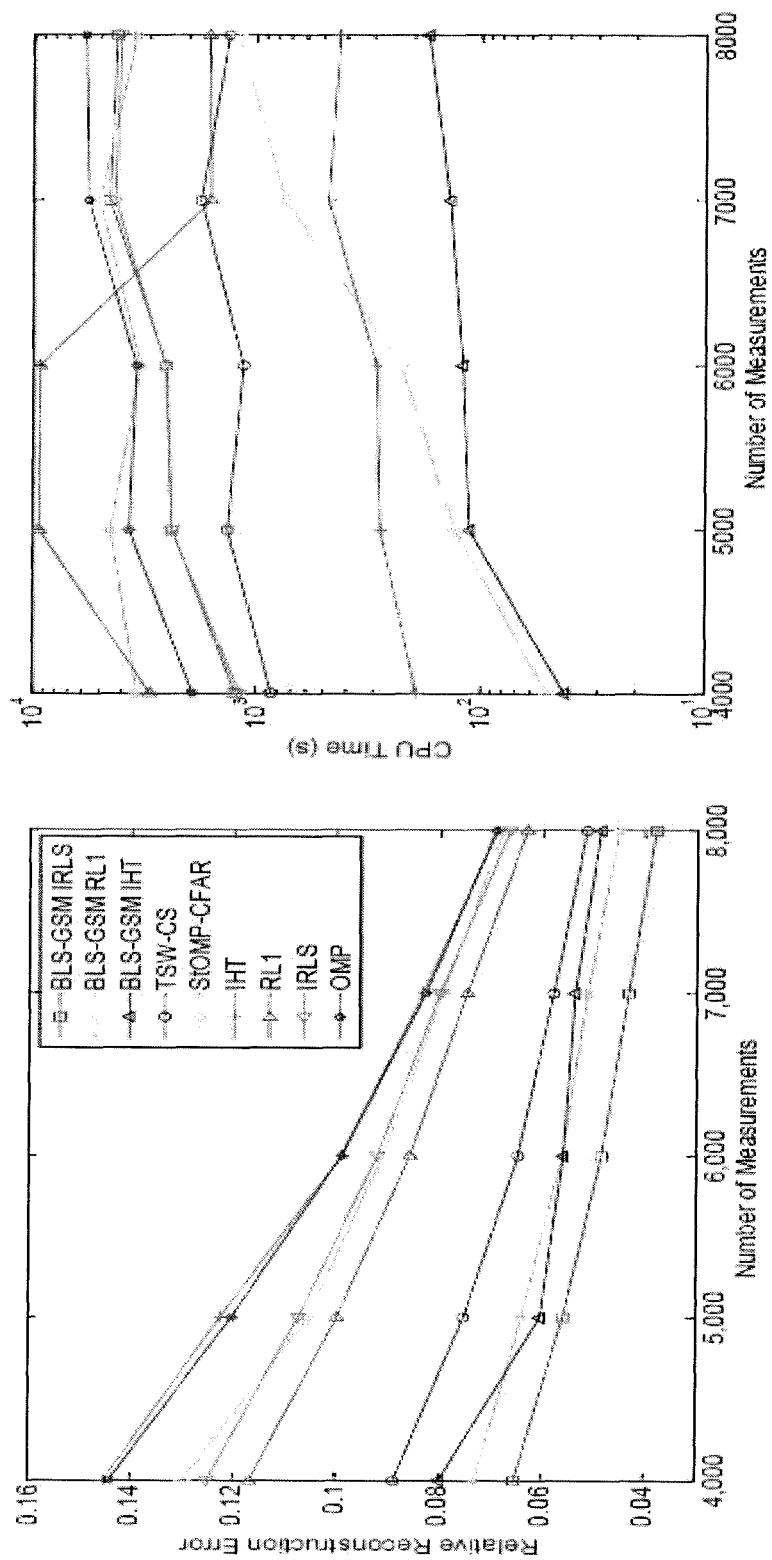
FIG. 4 shows exemplary reconstruction accuracy and computation times for different measurements using various CS techniques, including those according to exemplary embodiments of the invention.
Figure 5:
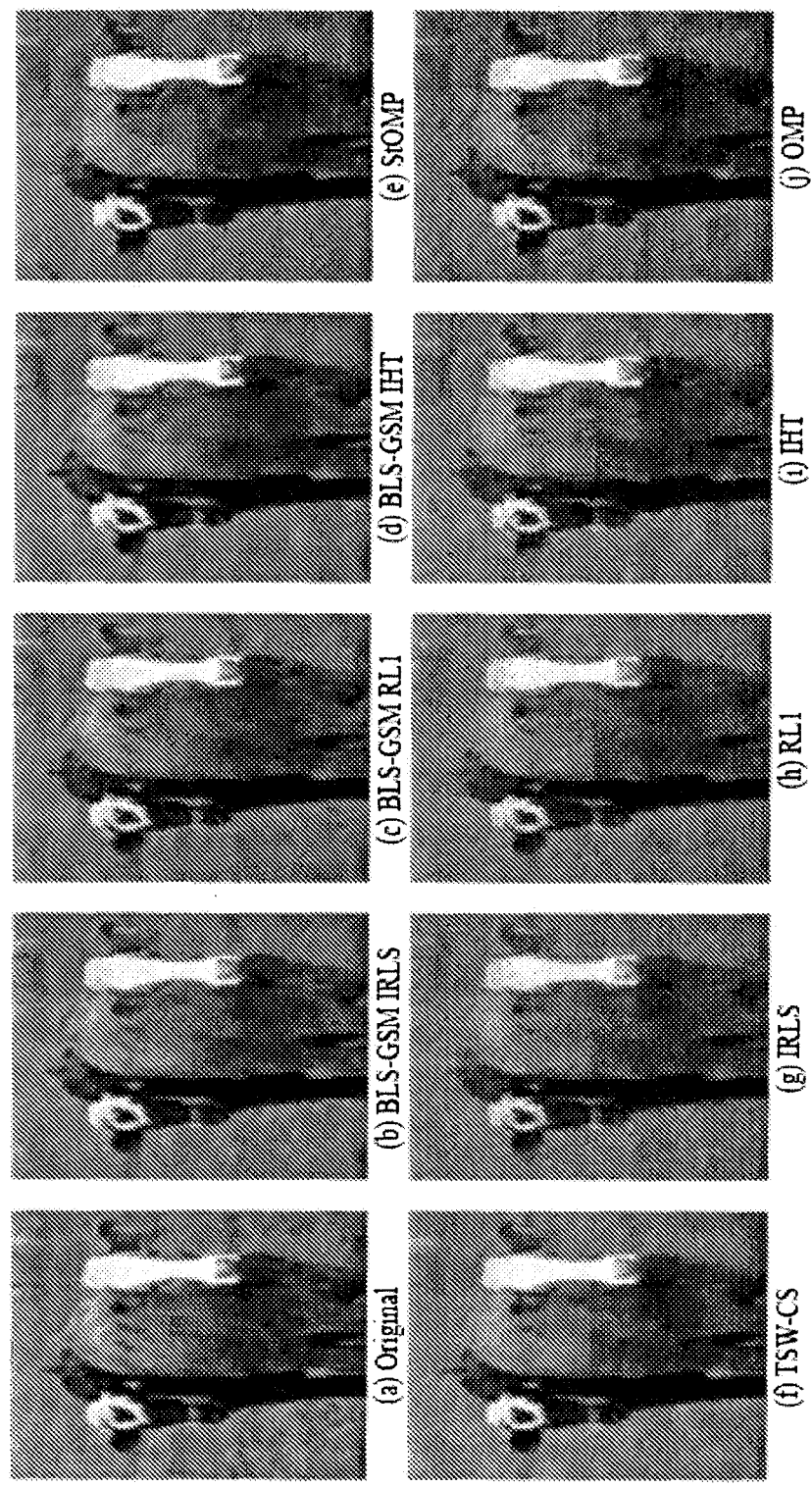
FIG. 5 shows examples of reconstructed images using CS techniques, including those according to exemplary embodiments of the invention.

Due to the incorporation of the BLS-GSM model as described above, embodiments of the invention may improve the recovery performances of various CS techniques such as RL1, IRLS, and IHT. FIG. 4 shows exemplary reconstruction accuracy and computation times for different measurements using various CS techniques, including those according to exemplary embodiments of the invention such as BLS-GSM IRLS, BLS-GSM RL1, and BLS-GSM IHT. FIG. 5 shows examples of reconstructed images using CS techniques, including those according to exemplary embodiments of the invention such as BLS-GSM IRLS, BLS-GSM RL1, and BLS-GSM IHT.

Figure 6:
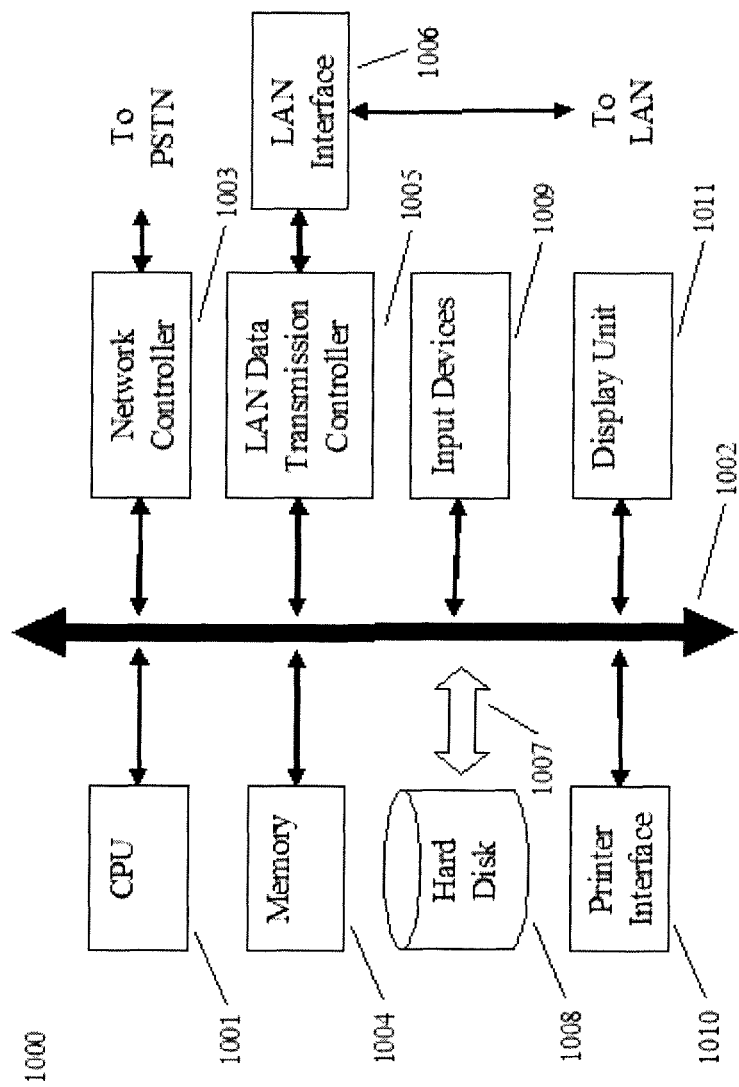
FIG. 6 illustrates an example of a computer system capable of implementing methods and systems according to embodiments of the present invention.

FIG. 6 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. For example, the method of FIG. 1 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. For example, the display unit 1011 may be used to display the constructed images. As shown, the system 1000 may be connected to a data storage device, for example, a hard disk, 1008 via a link 1007. CPU 1001 may be the computer processor that performs some or all of the steps of the methods described above with reference to FIGS. 1-6.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method for constructing an image, the method comprising:
    acquiring image data in a sensing domain;
    transforming the acquired image data into a sparse domain;
    approximating sparse coefficients based on the transformed acquired image data;
    performing a Bayes Least Squares estimation on the sparse coefficients based on a Gaussian Scale Mixtures Model to generate weights;
    approximating the updated sparse coefficients by using the updated weights and acquired image data;
    constructing an image based on the updated sparse coefficients; and
    displaying the constructed image.

2. The method of claim 1, wherein the approximating of the sparse coefficients and updated sparse coefficients is performed using compressed sensing.

3. The method of claim 2, wherein the compressed sensing comprises performing one of Reweighted $L_1$ minimization (RL1), Iteratively Reweighted Least Squares (IRLS), and Iterative Hard Thresholding (IHT) on the transformed acquired image data.

4. The method of claim 1, wherein the performing of the Bayes Least Squares estimation comprises modeling a neighborhood of wavelet coefficients of the sparse coefficients as a sum of a zero-mean Gaussian random vector and a noise vector with a variance.

5. The method of claim 4, wherein the transforming comprises performing a wavelet transform on the acquired image data to generate a plurality of sub-bands.

6. The method of claim 5, wherein the variance is based on a standard deviation of wavelet coefficients of a selected one of the sub-bands having a diagonal orientation and the highest frequency.

7. The method of claim 6, wherein the sub-bands include LL, HH, LH, and HL sub-bands, and wherein the selected one sub-band is the HH sub-band.

8. The method of claim 4, wherein the zero-mean Gaussian vector is multiplied by a scalar variable.

9. The method of claim 8, wherein the noise vector is additive white Gaussian noise, and the Gaussian random vector, the scalar variable, and the noise vector are independent of each other.

10. The method of claim 4, further comprising:
decreasing the variance to generate an updated variance;
performing a Bayes Least Squares estimation on the updated sparse coefficients based on the updated variance to generate an updated weight;
approximating the second updated sparse coefficients by using the updated weights and acquired image data;
constructing an updated image based on the second updated sparse coefficients; and
displaying the updated constructed image.

11. The method of claim 1, wherein the acquiring comprises performing one of a magnetic resonance imaging or a computed tomography scan over an area of the body.

12. The method of claim 1, wherein the constructing comprises performing an inverse wavelet transform on the updated sparse coefficients.

13. A non-transitory computer readable storage medium embodying instructions executable by a processor to perform method steps for constructing an image, the method steps comprising instructions for:
acquiring image data in a sensing domain;
transforming the acquired image data into a sparse domain;
approximating sparse coefficients based on the transformed acquired image data;
performing a Bayes Least Squares estimation on the sparse coefficients based on a Gaussian Scale Mixtures Model to generate weights;
approximating the updated sparse coefficients by using the updated weights and acquired image data;
constructing an image based on the updated sparse coefficients; and
displaying the constructed image.

14. A method for constructing an image, the method comprising:
acquiring image data in a sensing domain;
transforming the acquired image data into a sparse domain;
setting a variance based on a standard deviation of wavelet coefficients of a sub-band of the transformed acquired image data having a diagonal orientation and the highest frequency;
performing a Bayes Least Squares estimation on sparse coefficients of the wavelet coefficients based on a Gaussian Scale Mixtures Model with the variance to generate weights;
approximating the updated sparse coefficients by using the updated weights and acquired image data;
constructing an image based on the updated sparse coefficients; and
displaying the constructed image.

15. The method of claim 14, wherein the approximating of the sparse coefficients and updated sparse coefficients is performed using compressed sensing.

16. The method of claim 15, wherein the compressed sensing comprises performing one of Reweighted $L_1$ minimization (RL1), Iteratively Reweighted Least Squares (IRLS), and Iterative Hard Thresholding (IHT) on the transformed acquired image data.

17. The method of claim 14, wherein the performing of the Bayes Least Squares estimation comprises modeling a neighborhood of wavelet coefficients of the sparse coefficients as a sum of a zero-mean Gaussian random vector and a noise vector with the variance.

18. The method of claim 17, further comprising:
decreasing the variance to generate an updated variance;
performing a Bayes Least Squares estimation on the updated sparse coefficients based on the updated variance to generate an updated weight;
approximating second updated sparse coefficients by using the updated weights and acquired image data;
constructing an updated image based on the second updated sparse coefficients; and
displaying the updated constructed image.

19. The method of claim 18, wherein the zero-mean Gaussian vector is multiplied by a scalar variable.

20. The method of claim 19, wherein the noise vector is additive white Gaussian noise, and the Gaussian random vector, the scalar variable, and the noise vector are independent of each other.

* * * * *